United States Patent [19]
Moriya et al.

[11] Patent Number: 4,698,762
[45] Date of Patent: Oct. 6, 1987

[54] CRUISE CONTROL APPARATUS FOR VEHICLES

[75] Inventors: Koichi Moriya; Hidekazu Oshizawa, both of Higashimatsuyama, Japan

[73] Assignee: Diesel Kiki C., Ltd., Japan

[21] Appl. No.: 704,732

[22] Filed: Feb. 25, 1985

[30] Foreign Application Priority Data

Feb. 23, 1984 [JP] Japan ................................ 59-31393

[51] Int. Cl.$^4$ .................... B60K 31/04; G05D 13/52; F16H 5/66
[52] U.S. Cl. ................................ 364/424.1; 180/179; 364/426; 364/442
[58] Field of Search ...................... 364/424.1, 426, 442; 180/176, 179

[56] References Cited

U.S. PATENT DOCUMENTS

| 4,463,427 | 7/1984 | Bonnetain et al. | 364/442 |
| 4,463,822 | 8/1984 | Tanigawa et al. | 180/179 X |
| 4,506,752 | 3/1985 | Hara et al. | 180/179 |
| 4,539,642 | 9/1985 | Mizuno et al. | 364/426 |
| 4,564,906 | 1/1986 | Stephan et al. | 364/424.1 |
| 4,577,718 | 3/1986 | Ueno | 180/179 |
| 4,597,465 | 7/1986 | Burney | 180/179 X |

Primary Examiner—Felix D. Gruber
Attorney, Agent, or Firm—Guy W. Shoup

[57] ABSTRACT

A vehicle cruise control apparatus having an automatic transmission system comprises a calculator for calculating the optimum gear position of the transmission system for minimum fuel consumption for the vehicle operating condition at each instant, a circuit for temporarily releasing the cruise control operation carried out by a controling circuit when the optimum gear position is not coincident with an actual gear position, and a control circuit responsive to the result of the calculation for automatically shifting the transmission to the optimum gear position during the release condition of the cruise control, and the cruise control operation is automatically restored when the gear change operation is completed, whereby economical vehicle operation is carried out without inconveniencing the driver when the car is being driven in the cruise control mode.

3 Claims, 5 Drawing Figures

CRUISE CONTROL APPARATUS FOR VEHICLES

BACKGROUND OF THE INVENTION

The present invention relates to a cruise control apparatus for vehicles, and more particularly to a vehicle cruise control apparatus which is able to automatically carry out the shift operation of a transmission taking into account of the fuel consumption at each instant.

Vehicle cruise control apparatuses capable of controlling the speed of a car to maintain it at a desired or preset level are widely used. The cruise control apparatus according to the prior art is constituted in such a manner that the actual car speed is compared with the preset car speed and a car speed regulating member is controlled so as to reduce the difference between the actual car speed and the preset car speed to zero, the cruise control operation being carried out at the gear position selected by the driver.

Therefore, when a car which has been put under cruise control mode operation while traveling over level ground comes to an uphill climb, the engine has to assume a large load in order to output the desired driving power, so that fuel consumption is increased. Consequently, in such a case, the driver has to release the cruise control mode and then shift to the optimum gear position. Later he will have to restore the cruise control mode manually.

It is extremely inconvenient for the driver to have to shift to the optimum gear position manually when the car is operating in cruise control mode. Moreover, the manually selected gear position will not necessarily be the optimum position in terms of fuel consumption. Therefore, a high performance apparatus for cruise control which is free from this inconvenience and which assures optimum fuel economy has been desired.

An apparatus for automatically carrying out the gear change operation of a car is disclosed, for example, in Japanese Patent Application Disclosure No. Sho 58-81257. However, since the disclosed apparatus is intended to improve the feeling experienced by the driver when automatic gear change operation is carried out, the gear change operation is carried out without taking fuel economy into account so that the apparatus does not serve to reduce fuel consumption.

SUMMARY OF THE INVENTION

It is an object of the present invention to provide an improved cruise control apparatus for vehicles free from the drawbacks of the conventional apparatus.

It is another object of the present invention to provide a vehicle cruise control apparatus which automatically selects the gear position which provides the best fuel economy.

According to the present invention, in a cruise control apparatus for a vehicle having an internal combustion engine and an automatic transmission system to which the rotating output from the internal combustion engine is applied, the apparatus comprises a first control means responsive to a signal showing the actual vehicle speed for controlling the engine speed of the internal combustion engine so as to maintain the vehicle at a desired preset speed; a calculating means responsive to at least one signal showing the operating condition of the engine for calculating the optimum gear position of the transmission system for minimum fuel consumption at each instant; means for detecting the actual gear position of the transmission system at each instant; means for discriminating whether or not the actual gear position is coincident with the optimum gear position; a releasing means for temporarily releasing the cruise control operation carried out by the first control means when the actual gear position is not coincident with the optimum gear position; a second control means responsive to the result of the calculation by the calculating means for automatically shifting the transmission system to the optimum gear position during the period of operation of the releasing means; a detecting means for detecting the completion of the gear change operation in the transmission system and means responsive to the detection by the detecting means for restoring the cruise control operation by the first control means when the gear change operation is completed.

With this structure, it is constantly monitored during cruise control mode operation whether or not the vehicle is in the gear position which assures minimum fuel consumption. When it is discriminated that the actual gear position is not coincident with the optimum gear position, the cruise control operation is automatically temporarily released and the transmission system is automatically shifted to the optimum gear position. Consequently, economical vehicle operation is carried out without inconveniencing the driver even when the car is being driven in the cruise control mode.

The present invention will be better understood and the other objects and advantages thereof will be more apparent from the following detailed description of preferred embodiments with reference to the accompanying drawings.

DESCRIPTION OF THE PREFERRED EMBODIMENTS

Figure 1:
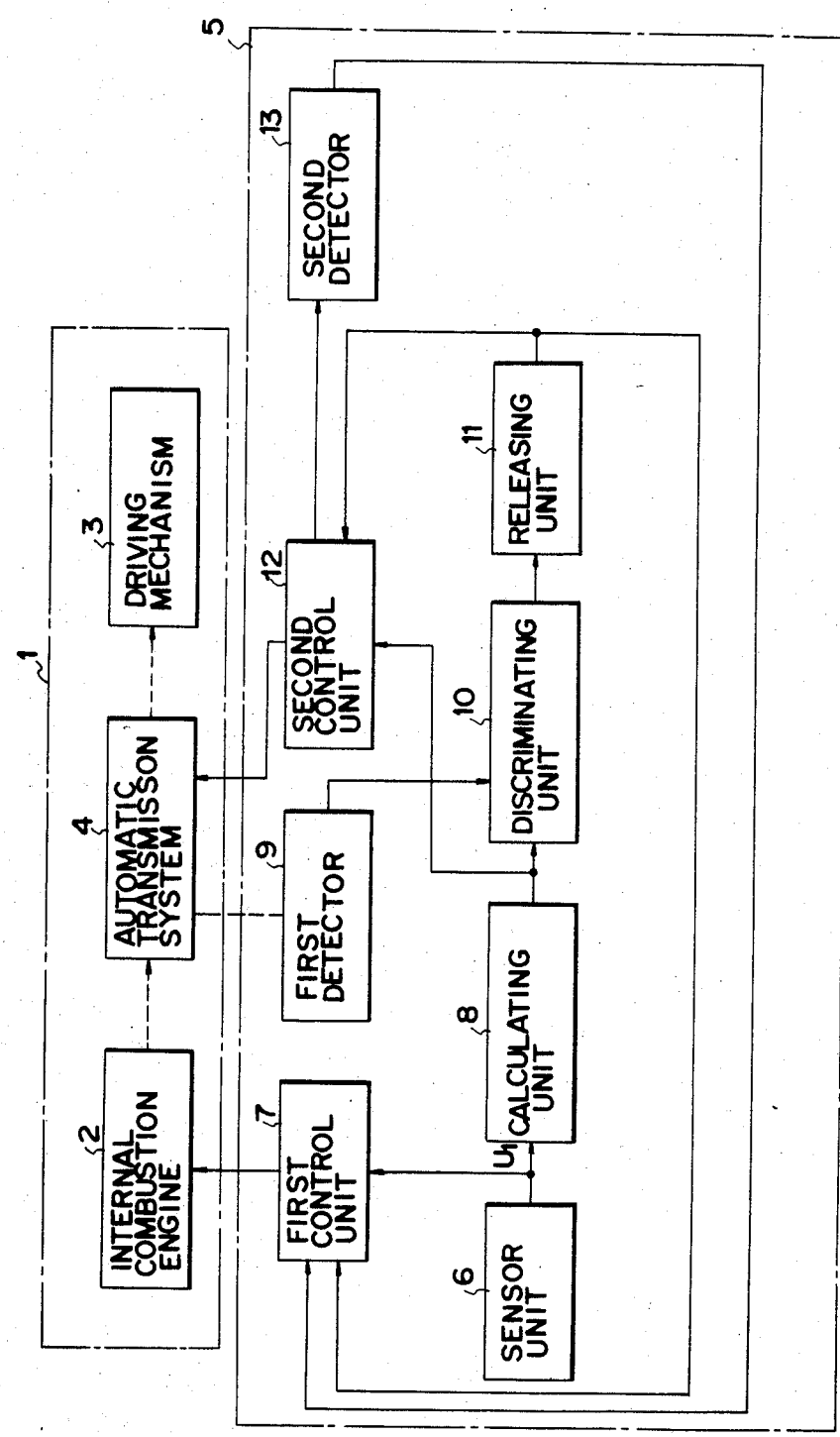
FIG. 1 is a block diagram showing an embodiment of the present invention as applied to a vehicle.

FIG. 1 is a block diagram showing the basic concept of the vehicle cruise control apparatus according to the present invention. A vehicle 1 has an internal combustion engine 2 and a driving mechanism 3 for driving the vehicle 1. The rotational output from the internal combustion engine 2 is transmitted through an automatic transmission system 4 including, for example, a speed-change-gear-type transmission, and the driving mechanism 3 is driven by the output power from the automatic transmission system 4. The cruise control apparatus 5 of the present invention has a first control unit 7 to which a state signal $U_1$, including a signal component showing the actual vehicle speed, is applied from a sensor unit 6, and the speed control operation of the internal combustion engine 2 is carried out by the first control unit 7 in such a manner that the vehicle 1 is maintained at a desired preset speed.

The signal $U_1$, from the sensor unit 6 is also applied to a calculating unit 8 which calculates the gear position of the automatic transmission system 4 which can be expected to result in minimum fuel consumption. This calculation is made on the basis of the engine operating condition at each instant by, for example, a stored mapping of data representing a predetermined relationship of the desired variables and input parameters, herein referred to as "map calculation".

A first detector 9 is connected with the automatic transmission system 4 for detecting the actual gear position of the transmission system 4 at each instant, and a discriminating unit 10 discriminates whether or not the optimum gear position determined by the calculating unit 8 is coincident with the actual gear position detected by the first detector 9. When the discriminating unit 10 finds that the actual gear position is not coincident with the optimum gear position, a releasing unit 11 is operated to temporarily release the cruise control operation being carried out by the first control unit 7. At the same time, a second control unit 12 for controlling the gear change operation of the automatic transmission system 4 operates to automatically shift the transmission system 4 on the basis of the result calculated by the calculating unit 8, whereby minimum fuel consumption can be realized.

When completion of the automatic gear change operation by the second control unit 12 is detected by a second detector 13, a signal is sent to the first control unit 7 which in response cancels the temporary release of cruise control, restoring cruise control operation.

With this structure, it is constantly monitored during cruise control mode operation whether or not the vehicle is in the gear position which assures minimum fuel consumption. When it is discriminated that the actual gear position is not coincident with the optimum gear position, the cruise control operation is automatically temporarily released and the transmission system is automatically shifted to the optimum gear position. Consequently, economical vehicle operation is carried out without inconveniencing the driver even when the car is being driven in the cruise control mode.

Figure 2:
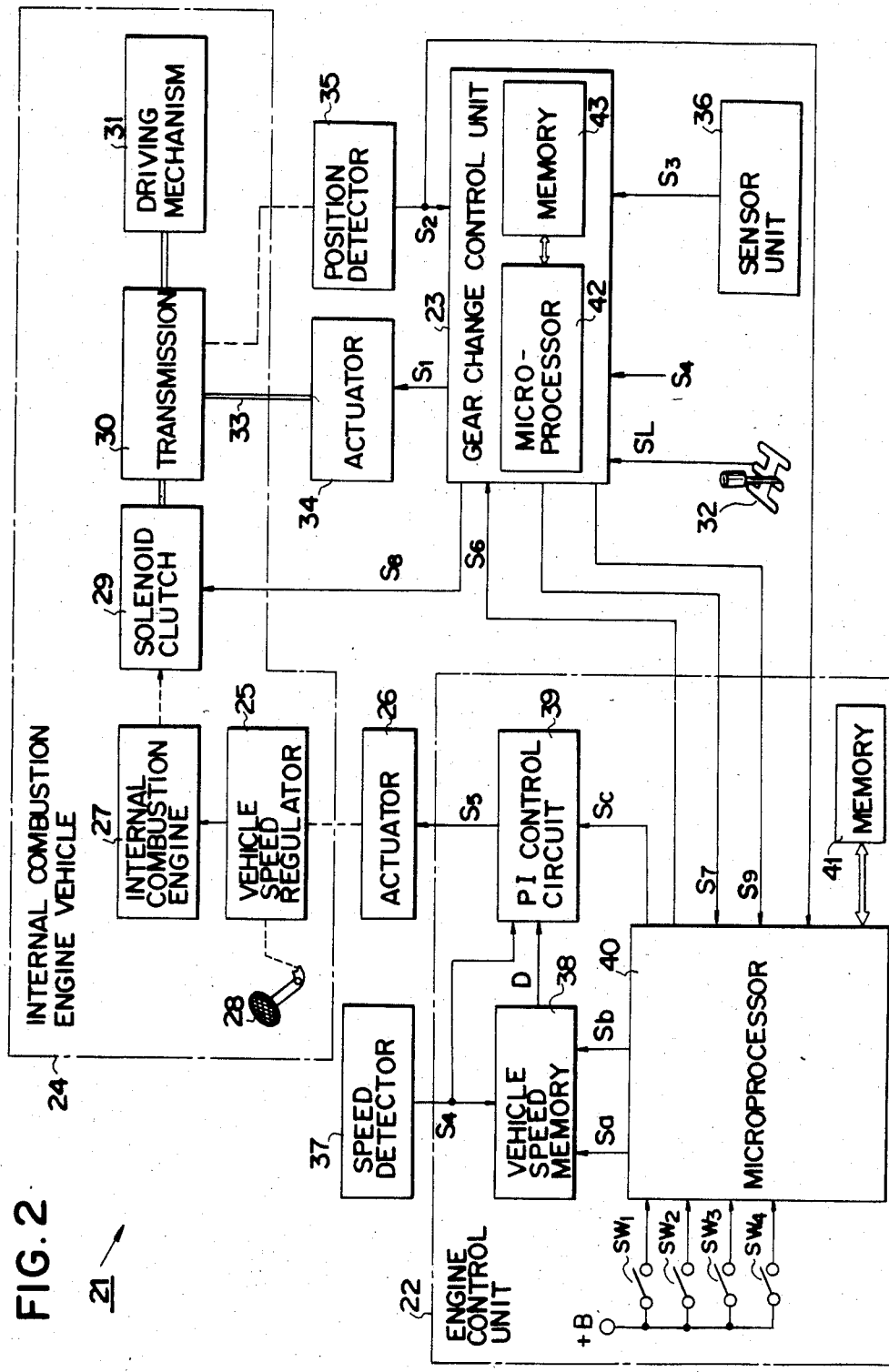
FIG. 2 is a block diagram showing another embodiment of the cruise control apparatus of the present invention.

FIG. 2 shows a second, more detailed embodiment of a vehicle cruise control apparatus according to the present invention. The cruise control apparatus 21 shown in FIG. 2 has an engine control unit 22 and gear change control unit 23. An actuator 26 connected with a vehicle speed regulator 25 of a vehicle 24 is controlled by the engine control unit 22 in such a manner that the amount of fuel supplied to an internal combustion engine 27 is regulated to control the speed of the vehicle 24. An accelerator pedal 28 is connected with the vehicle speed regulator 25 so as to make it possible to control the vehicle speed also by the operation of the accelerator pedal 28.

The rotational output power from the internal combustion engine 27 is transmitted through a solenoid clutch 29 which is operable by an electric signal and a speed-change-gear-type transmission 30 to a driving mechanism 31 for driving the vehicle 24. A gearshift rod 33 of the transmission 30 is adapted to be movable in the shift direction and the select direction and is connected with an actuator 34 which operates in accordance with a first control signal $S_1$ from the gear change unit 23. Thus, the gearshift rod 33 is controlled by the actuator 34, whereby the transmission 30 can be shifted to a desired gear position.

A position detector 35 detects the gear position of the transmission 30 at each instant and produces a position signal $S_2$ indicative of the detection which is applied to the gear change control unit 23. Furthermore, a signal $S_3$ showing the amount Q of fuel supplied to the engine and a signal $S_4$ showing the actual speed of the vehicle 24 are produced from a sensor unit 36 and a speed detector 37 and applied to the gear change control unit 23. The gear change control unit 23 further receives a select signal SL showing a gear position selected by the driver from a selector 32 and a control status signal $S_6$ showing the control status of the engine control unit 22 from the engine control unit 22. The gear change control unit 23 produces the first control signal $S_1$ for controlling the actuator 34 and a second control signal $S_8$ for controlling the engaging/disengaging operation of the friction clutch 29. The structure and operation of the gear change control unit 23 will be described in more detail later.

Now a description will be made of the engine control unit 22. The signal $S_4$ is supplied to a vehicle speed memory 38 and a PI control circuit 39. The vehicle speed memory 38 is adapted to store the vehicle speed data indicated by the signal $S_4$ each time the level of a set signal $S_a$ produced by a microprocessor 40 changes from low to high, and the data stored in the vehicle speed memory 38 is supplied to the PI control circuit 39 as a desired or preset vehicle speed data D.

The set signal $S_a$ is produced at the time a set switch $SW_1$ connected to the microprocessor 40 is opened after once being closed. Consequently, when the set switch $SW_1$ is operated by the driver so as to be switched-over from ON to OFF when the vehicle 24 reaches a desired speed, the desired vehicle speed is stored in the vehicle speed memory 38 as preset vehicle speed data D.

The PI control circuit 39 calculates the difference between the preset vehicle speed shown by the data D stored in the vehicle speed memory 38 and the actual vehicle speed shown by the signal $S_4$ and produces a driving signal $S_5$ in accordance with the calculated difference. The driving signal $S_5$ is applied to the actuator 26.

The vehicle speed regulator 25 is driven by the actuator 26 in accordance with the driving signal $S_5$ in such a way that the actual vehicle speed becomes coincident with the preset vehicle speed. The vehicle speed regulator 25 may, for example, be the control lever of a fuel injection pump in the case of a diesel engine or a throttle valve in the case of a gasoline engine. The amount of fuel supplied to the engine 27 is increased by the vehicle speed regulator 25 so as to increase the vehicle speed when the actual vehicle speed is lower than the preset vehicle speed, while the amount of fuel supplied to the engine 27 is reduced by the vehicle speed regulator 25 so as to reduce the vehicle speed when the actual vehicle speed is higher than the preset vehicle speed, whereby the actual vehicle speed is controlled so as to be coincident with the preset vehicle speed.

For performing cruise control, the engine control unit 22 has, aside from the set switch $SW_1$, a main switch $SW_2$ which is closed when the power switch (not shown) is turned ON, a brake switch $SW_3$ which is closed when the brake pedal (not shown) is depressed and a resume switch $SW_4$. These switches $SW_1$ to $SW_4$ are connected to the microprocessor 40 and the information concerning the ON/OFF states of these switches $SW_1$ to $SW_4$ is applied to the microprocessor 40.

The position signal $S_2$ is also applied to the microprocessor 40 to provide it with information concerning the gear position at each instant. In accordance with the information supplied thereto, the microprocessor 40 performs calculations for controlling the operations of the vehicle speed memory 38 and the PI control circuit 39 and then produces a reset signal $S_b$ for resetting the vehicle speed memory 38 and an inhibit signal $S_c$ for inhibiting the operation of the PI control circuit 39.

More specifically, the set signal $S_a$ is produced to store the preset vehicle speed data in the vehicle speed memory 38 in response to the operation of the set switch $SW_1$ in the manner described above. The inhibit signal $S_c$ is produced to temporarily release the cruise control operation when the brake switch $SW_3$ is closed by the depression of the brake pedal during cruise control operation.

In addition, the temporarily released condition of the cruise control is canceled by the closing operation of the resume switch $SW_4$ and the cruise control condition is restored.

In order to temporarily discontinue the cruise control operation in the manner described below and to automatically restore the cruise control operation without operation of the resume switch $SW_4$ when the gear change operation is completed, a control program is stored in a memory 41 for discriminating on the basis of the order of the ON/OFF operations of the switches $SW_1$ to $SW_4$ whether or not the gear change operation is carried out and for carrying out the temporary release of the cruise control operation. The program is executed in the microprocessor 40.

The construction and operation of the gear change control unit 23 will now be described.

The gear change control unit 23 is for automatically shifting the gears of the transmission 30 in such a way that the vehicle 24 is always operated in the gear position which results in the least fuel consumption, which gear position is determined by a calculation based on the operating condition of the vehicle 24 at each instant.

The gear change control unit 23 includes a microprocessor 42, and a control program stored in a memory 43 is executed in the microprocessor 42, whereby the gear change operation described above is performed.

Figure 3A:
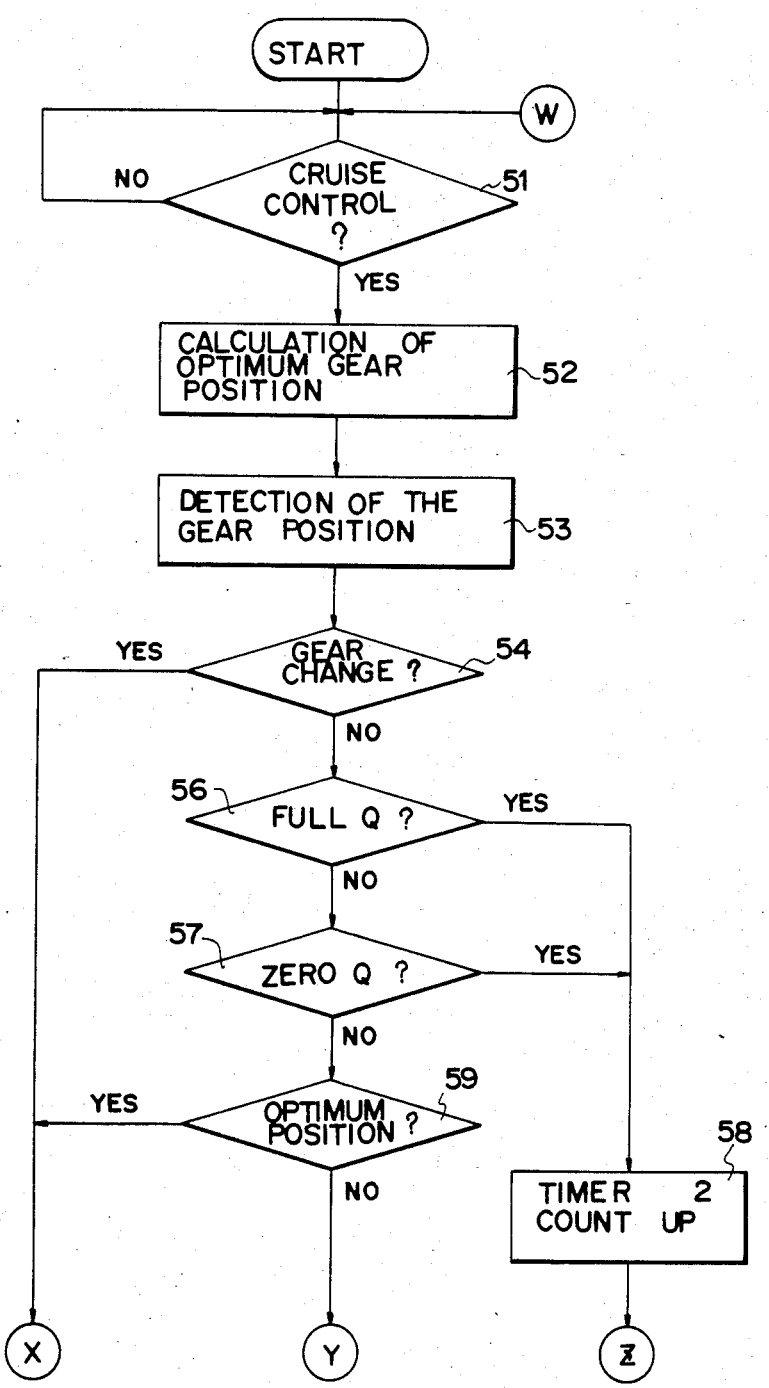
FIGS. 3A and 3B are flow charts showing a control program executed in a microprocessor of a gear change control unit shown in FIG. 2.
Figure 3B:
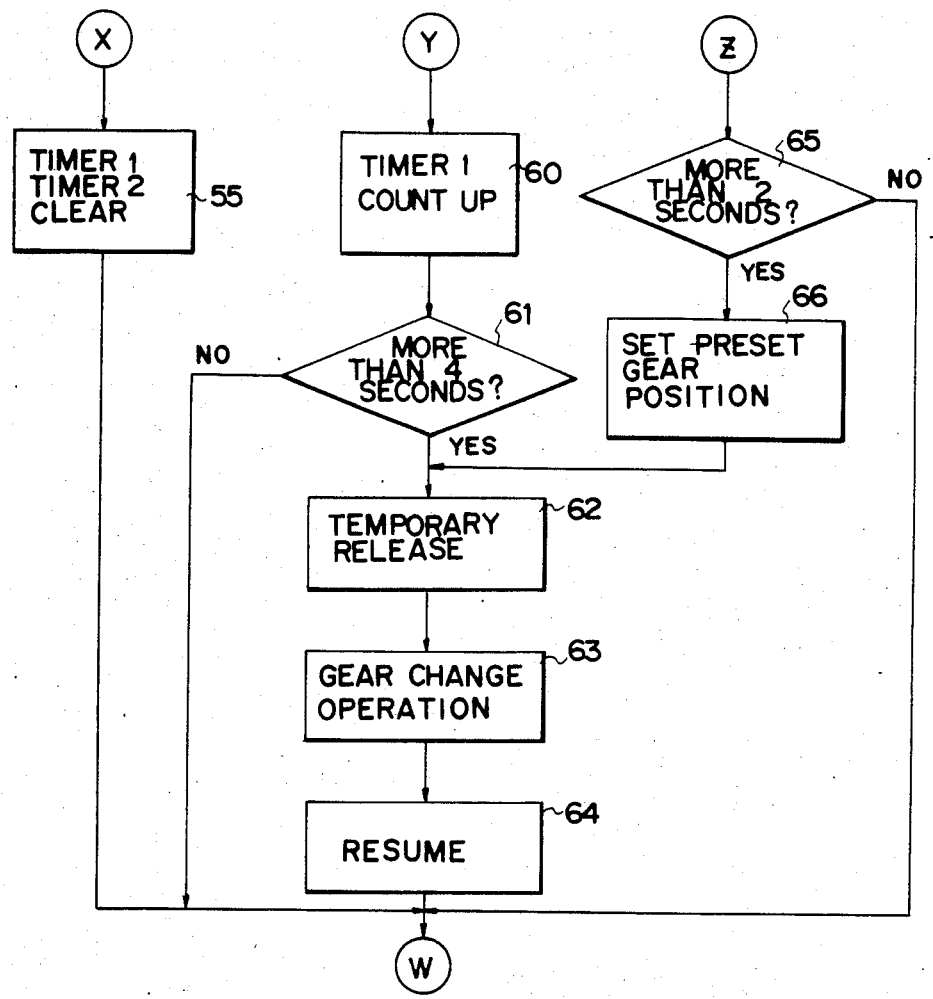

The program stored in the memory 43 is shown in the flow chart in FIG. 3. The operation of the gear change control unit 23 will be described with reference to FIG. 3.

After the start of the program, a decision is made in step 51 on the basis of the control state signal $S_6$ output from the microprocessor 40 as to whether the vehicle 24 is running in the cruise control mode. The operation returns to step 51 and assumes a standby state when the decision in step 51 is NO, while the operation moves to step 52 in which the optimum gear position of the transmission 30 to be set in accordance with the condition of operation of the vehicle 24 at that time in view of fuel consumption is calculated when the decision in step 51 is YES. The calculation is carried out by map calculation based on the signals $S_3$ and $S_4$ in this embodiment. However, the method of calculation is not limited to map calculation and any other calculation method may be employed.

Figure 4:
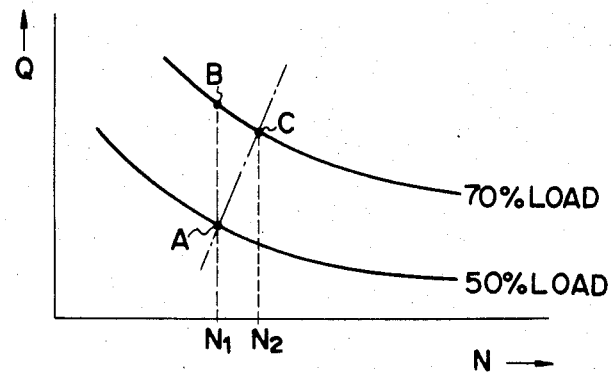
FIG. 4 is a graph showing characteristic curves for explaining the calculation for obtaining the optimum gear position.

FIG. 4 is a map for obtaining the operating point at which the fuel consumption is minimum, the operating point being determined on the basis of the engine speed N, the amount Q of fuel supplied and the load L of the vehicle. The figure shows the characteristic curves for 70% load and 50% load operation of the vehicle and the intersection points A and C of these curves with a chain line connecting the points of optimum fuel economy.

Assume that the vehicle 24 is operating at the operating point A of FIG. 4 under 50% load and that the load then increases for some reason, such as uphill climbing. When the load of the vehicle 24 operated at the operating point A changes from 50% to 70%, the operating point will change from point A to point B if the engine speed N is maintained the same as that at point A. However, as will be understood from FIG. 4, the point B is not the optimum point in view of fuel economy. Point C is the optimum point. Thus, in step 52, a calculation is carried out for determining the gear position which will cause the engine speed N to approach the speed $N_2$ corresponding to the point C while maintaining the preset vehicle speed. The gear position determined by this calculation is defined as the optimum gear position at that time.

After the calculation of the optimum gear position, the actual gear position is detected on the basis of the position signal $S_2$ in step 53 and a decision is made in step 54 as to whether gear change operation is now being carried out. When the decision in step 54 is YES, the operation returns to step 51 after timers 1 and 2 are reset respectively in step 55.

When the decision in step 54 is NO, a decision is made in step 56 as to whether the amount of fuel supplied to the engine 27 is maximum (Full Q). When the decision in step 56 is NO, a decision is made in step 57 as to whether the amount of fuel supplied to the engine 27 is zero (Zero Q). When the decision in either step 56 or 57 is YES, that is, when the amount of fuel supplied to the engine 27 is maximum or zero, the operation moves to step 58 where the count-up operation of the timer 2 is started.

When the decisions in both steps 56 and 57 are NO, the operation moves to step 59 where a decision is made as to whether the actual gear position detected in step 53 is coincident with the optimum gear position calculated in step 52. When the decision in step 59 is YES, the operation moves to step 55 where the timers 1 and 2 are reset, and the gear change operation is not carried out. When the decision in step 59 is NO, the operation moves to step 60, where the count-up operation of the counter 1 is started and then a decision is made in step 61 as to whether the state determined in step 59 has continued for more than 4 seconds.

The operation returns to step 51 when the decision in step 61 is NO, while, when it is YES, the operation moves to step 62 where a signal $S_7$ for temporarily releasing the cruise control operation is sent to the microprocessor 40 to carry out the temporary release of the cruise control operation. After the execution of step 62, the gear change operation is carried out in step 63.

In the gear change operation of step 63, after the friction clutch 29 is disengaged by the second control signal $S_8$, the shift rod 33 of the transmission 30 is operated by the first control signal $S_1$ in such a manner that the transmission 30 is shifted to the optimum gear position. When the transmission 30 has been shifted to the optimum gear position, completion of the gear change operation is detected from the position signal $S_2$, and the friction clutch 29 is engaged by the second signal $S_8$. After this, so as to cancel the temporary release state of cruise control operation and to restore cruise control operation, the resume signal $S_9$ is output and is applied to the microprocessor 40.

The operation of this program will be described for the case where step 58 is executed. When the timer 2 starts to count up in step 58, a decision is made in step 65 as to whether the count of the timer 2 exceeds 2 seconds. When the decision in step 65 is NO, the operation returns to step 51. When the decision in step 65 is YES, the operation moves to step 66 where a gear position one position lower than the current preset gear position is set as the new preset gear position and the operation moves to step 62.

As a result, after the cruise control operation has been temporarily released in step 62, in step 63, the transmission 30 is shifted to the preset gear position set in step 66. That is, when full Q state or zero Q state has continued for more than 2 seconds, it is assumed that the vehicle is in the overload or mortoring state, so that the transmission 30 is shifted down by one gear position.

The operation of the cruise control apparatus 21 will now be described.

While the vehicle 24 is running in cruise control mode under the control of the engine control unit 22, the gear change control unit 23 constantly carries out discriminating operation to determine whether or not the actual gear position is the optimum gear position in terms of fuel economy (steps 52, 53 and 59). When it is discriminated that the actual gear position is not coincident with the optimum gear position (step 59), it is discriminated whether or not this state has continued for more than four seconds (step 61). If the "NO" state continues in step 59 for more than 4 seconds, the cruise control operation of the engine control unit 22 is temporarily released by the signal $S_7$. Then, a gear change operation for shifting the transmission 30 to the optimum gear position is carried out by the gear change control unit 23 during the time that cruise control operation remains in the temporarily released state. When the gear change operation is completed, a signal $S_9$ for restoring cruise control is applied to the engine control unit 22 by the gear change control unit 23.

As a result, the gear position is automatically shifted to the gear position assuring optimum fuel economy by the gear change control unit 23 and the engine control unit 22 without the necessity of any manual operation.

What is claimed is:

1. A cruise control apparatus for a vehicle having an internal combustion engine supplied with fuel and a transmission which is operated to shift gear positions by an actuator in response to a gear shift signal and is connected through a clutch to the internal combustion engine, said apparatus comprising:

regulating means for regulating the amount of fuel supplied to the internal combustion engine in response to a driving signal;

speed detecting means for detecting an actual speed of the vehicle at each instant;

engine control means providing the driving signal for controlling said regulating means in response to an output signal from said speed detecting means so as to maintain the vehicle speed at a desired preset speed for cruise control operation, said engine control means including means for temporarily releasing and resuming the cruise control operation in response to release and resume input signals;

gear position detecting means for detecting an actual gear position of the transmission at each instant;

a fuel amount detector for detecting the amount of fuel supplied to the engine; and a gear change control unit having a microprocessor and a control program which are responsive to said fuel amount detector, said gear position detecting means, and at least one signal indicating an operating condition of the engine for calculating an optimum gear position of the transmission for minimum fuel consumption when the amount of fuel supplied to the engine is not a maximum amount or zero, and for setting a desired preset gear position one gear position lower than the current gear position when the amount of fuel supplied to the engine is a maximum amount of zero, said gear change control unit further having means for providing a release signal to said engine control means for temporarily releasing the cruise control operation and a gear shift signal to the transmission actuator in order to carry out a gear shift operation when the actual gear position detected by said gear position detecting means is not in the optimum gear position or the preset gear position, and for providing a resume signal to said engine control means for resuming the cruise control operation when the gear shift operation is completed.

2. A cruise control apparatus according to claim 1, wherein said gear change control unit is responsive to said fuel amount detector for determining whether the amount of fuel supplied to the engine continues in the maximum amount or zero state for more than a predetermined period in order to set said preset gear position.

3. A cruise control apparatus according to claim 1, wherein said gear change control unit is responsive to said gear position detecting means for determining whether the actual gear position is not in accordance with the calculated optimum gear position for more than a predetermined period before carrying out the gear shift operation.

* * * * *